United States Patent
Chien et al.

(10) Patent No.: US 7,383,384 B2
(45) Date of Patent: Jun. 3, 2008

(54) PROVIDING MULTIPLE FAULTS PROTECTION FOR AN ARRAY OF STORAGE DEVICES

(75) Inventors: Hung-Ming Chien, Hsinchu (TW); Sy-Yen Kuo, Taipei (TW)

(73) Assignee: Promise Technology, Inc., Hsin-Chu (TW)

(*) Notice: Subject to any disclaimer, the term of this patent is extended or adjusted under 35 U.S.C. 154(b) by 284 days.

(21) Appl. No.: 11/216,657

(22) Filed: Aug. 31, 2005

(65) Prior Publication Data
US 2006/0117217 A1    Jun. 1, 2006

(30) Foreign Application Priority Data
Nov. 11, 2004    (TW) ............................ 93134437 A

(51) Int. Cl.
G06F 11/00    (2006.01)
G06F 11/30    (2006.01)
G06F 12/00    (2006.01)
G06F 13/00    (2006.01)
G06F 13/28    (2006.01)

(52) U.S. Cl. .................. 711/114; 711/111; 711/112; 711/114; 711/203; 714/48; 714/52; 714/54; 714/746; 714/758

(58) Field of Classification Search ............... None
See application file for complete search history.

(56) References Cited

U.S. PATENT DOCUMENTS

| 6,138,125 A * | 10/2000 | DeMoss ............... 707/202 |
| 6,557,123 B1 * | 4/2003 | Wiencko et al. ............ 714/701 |
| 7,093,182 B2 * | 8/2006 | Dickson ............... 714/770 |
| 2003/0070042 A1 * | 4/2003 | Byrd et al. ............... 711/114 |

OTHER PUBLICATIONS

Bernard Sklar, Reed-Solomon Codes, Apr. 12, 2002, Prentice-Hall, Article is excerpted from 'Digital Communications: Fundamentals and Applications', Prentice-Hall, Second Edition, article p. 1 and 33.*

* cited by examiner

Primary Examiner—Donald Sparks
Assistant Examiner—Fred W Detschel
(74) Attorney, Agent, or Firm—Muncy, Geissler, Olds & Lowe, PLLC

(57) ABSTRACT

A data storage system including an array of storage devices and a storage controller is provided. The array of storage devices is configured to store information in the form of a plurality of stripes. The storage controller is configured to write a plurality of code words forming each stripe to the array of storage devices. The plurality of code words includes a plurality of data blocks and at least one redundancy block. K sets of parameters, which are generated based on a generator polynomial, are previously provided. The storage controller includes an encoder for generating the redundancy blocks according to the K sets of parameters. Once up to K storage devices in the array of storage devices are failed, the data storage system recovers the failed storage devices based on the K sets of parameters and the other un-failed blocks, wherein K can be larger than two.

13 Claims, 1 Drawing Sheet

PROVIDING MULTIPLE FAULTS PROTECTION FOR AN ARRAY OF STORAGE DEVICES

BACKGROUND OF THE INVENTION

1. Field of the Invention

Figure 1:
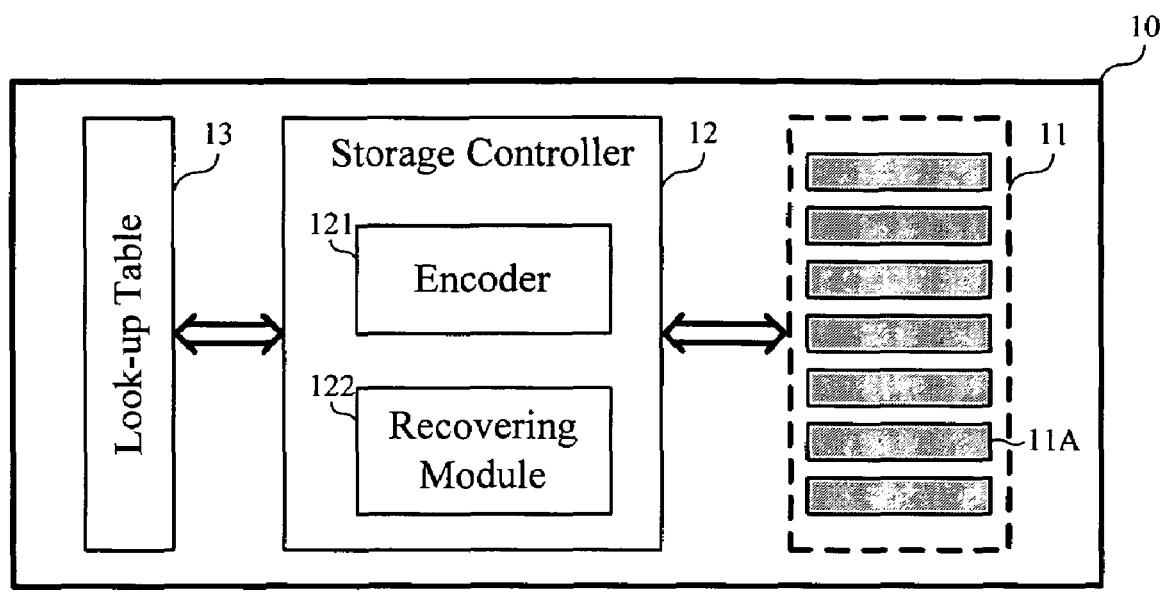

This invention relates to a data storage system. More specifically, the invention relates to a data storage system including an array of storage devices and providing multiple-faults protection.

2. Description of the Prior Art

In recent years, the speed and efficiency of computers are continuously raised and the capacities of storage systems are highly increased. Besides capacity and performance, reliability of large storage systems is also extremely important. To achieve better reliability, the abilities of error detection and error correction must be improved in large storage systems.

An array of storage devices is usually used for providing a larger data capacity than one single storage device. A technique named "redundancy" is frequently applied in arrays of storage devices. Redundancy means adding additional storage devices to store information about data in the original storage devices. Once the storage devices for storing data are failed, the data storage system can recover the data in the failed storage devices according to the redundancy information.

In actual applications, an array of storage devices may include a plurality of disks. Existing redundant arrays of independent disks (RAID) can be classified into the following categories: RAID 0, RAID 1, RAID 10, RAID 0+1, RAID 2, RAID 3, RAID 53, RAID 4, RAID 5 and RAID 6.

However, conventional RAIDs in prior arts can not provide sufficient protection for data or can only provide protection for data with a large amount of additional disk drives. RAID0 doesn't provide any redundancy. RAID1 provides single-fault protection by providing duplicate disk drives for each of the disk drives in the RAID 0 array. RAID 2, RAID3, RAID 4, and RAID 5 can also only provide single-fault protection, and once more than one disk drive is failed, the failed disk drives cannot be recovered. RAID 6 needs two additional disk drives for recovering two failed disk drives and once more than two disk drives are failed simultaneously, the failed disk drives can not be recovered.

The main purpose of this invention is providing a data storage system including an array of storage devices and providing multiple-faults protection. More particularly, once up to K storage devices in the array of storage devices are failed, the data storage system recovers the failed storage devices based on K sets of previously provided parameters, which are generated based on a generator polynomial. Especially, K can be a natural number larger than two. Accordingly, this invention provides a data storage system having multiple-faults protections and the data storage system can tolerate more failed storage devices than prior arts.

SUMMARY OF THE INVENTION

The main purpose of this invention is providing a data storage system wherein K sets of parameters generated based on a generator polynomial are previously provided.

The data storage system of one preferred embodiment according to this invention includes an array of storage devices and a storage controller. The array of storage devices is configured to store information in the form of a plurality of stripes. The storage controller is coupled to the array of storage devices and configured to write a plurality of code words forming each stripe to the array of storage devices. The plurality of code words represents a systematic mapping of a plurality of data blocks according to the generator polynomial and includes the plurality of data blocks and at least one redundancy block. The storage controller includes an encoder configured to generate the at least one redundancy block according to the plurality of data blocks and the K sets of parameters in an encoding mode. Once up to K storage devices in the array of storage devices are failed, the data storage system recovers the code words in the failed storage devices based on the K sets of parameters and the code words in the other un-failed storage devices.

The advantage and spirit of the invention may be understood by the following recitations together with the appended drawings.

BRIEF DESCRIPTION OF THE APPENDED DRAWINGS

FIG. 1 is the data storage system of one preferred embodiment according to this invention.

DETAILED DESCRIPTION OF THE INVENTION

The main purpose of this invention is providing a data storage system wherein K sets of parameters generated based on a generator polynomial are previously provided.

Please refer to FIG. 1. A data storage system of one preferred embodiment according to this invention is shown in FIG. 1. The data storage system 10 includes an array of storage devices 11, a storage controller 12, and a look-up table 13. The array of storage devices 11 includes a plurality of storage devices 11A and is configured to store information in the form of a plurality of stripes. In actual applications, the storage devices 11A can be disk drives. The storage controller 12 is coupled to the array of storage devices 11 and configured to write a plurality of code words forming each stripe to the storage devices 11A. The plurality of code words represents a systematic mapping of a plurality of data blocks according to the generator polynomial and includes the plurality of data blocks and at least one redundancy block. The look-up table 13 is used for storing the K sets of previously provided parameters.

The storage controller 12 includes an encoder 121 configured to generate the at least one redundancy block according to the plurality of data blocks and the K sets of parameters in an encoding mode. The storage controller 12 also includes a recovering module 122. Once up to K storage devices 11A in the array of storage devices 11 are failed, the recovering module 122 recovers the code words in the failed storage devices 11A based on the K sets of parameters and the code words in the other un-failed storage devices 11A.

In actual applications, the generator polynomial can be a cyclic code generator polynomial; more particularly, the generator polynomial can be a Reed-Solomon code generator polynomial.

Reed-Solomon codes are designed using the principles of finite field theory. A field is a set of elements along with two defined operations on the elements. The two operations are typically denoted by operators '+' and '×'. A field is constructed so as to have the following properties: (a) the field is closed under both operators; (b) both operators are commutative; (c) both operators are associative; (d) each operator has a unique identity element (if a is a element of the field, so are a+0=a and a×1=a); (e) one operator is distributive across the other; (f) every element has a unique additive inverse (a+[−a]=0); and (g) every non-zero element has a unique multiplicative inverse (a×a$^{-1}$=1). Fields that are finite (the number of elements are not infinite) are called "Galois field" and denoted GF(p), wherein p is the number of elements in the field.

Typically, a K-th order Reed-Solomon code generator polynomial can be represented as: $g(x)=(x-\alpha^N)\times(x-\alpha^{(N+1)})\times \ldots \times(x-\alpha^{(N+K-1)})$, wherein the coefficient field is $GF(q^P)$, $\alpha$ is a primitive element of $GF(q^P)$, q is a prime number, and P and N are positive integers.

In the preferred embodiment according to this invention, the array of storage devices 11 includes (M+K) storage devices, wherein M is a natural number. One stripe in the array of storage devices 11 includes M subsets of data blocks ($D_{(M-1)}$, $D_{(M-2)}$, ..., $D_0$) and K subsets of redundancy blocks ($C_{(K-1)}$, $C_{(K-2)}$, ..., $C_0$) generated by the encoder 121. Each subset is stored in one storage device 11A, respectively.

The M subsets of data blocks can be represented in the form of a polynomial:

$$M(x)=D_{(M-1)}x^{(M-1)}+D_{(M-2)}x^{(M-2)}+\Lambda+D_0x^0. \quad \text{(Equation 1)}$$

The K subsets of redundancy blocks can also be represented in the form of another polynomial:

$$K(x)=C_{(K-1)}x^{(K-1)}+C_{(K-2)}x^{(K-2)}+\Lambda+C_0x^0. \quad \text{(Equation 2)}$$

According to Equation 1 and 2, the M subsets of data blocks and the K subsets of redundancy blocks can be combined in one polynomial:

$$\begin{aligned}C(x) = M(x)+K(x) = & \quad \text{(Equation 3)}\\ D_{(M-1)}x^{(M+K-1)}+\Lambda+D_0x^K+C_{(K-1)}x^{(K-1)}+\Lambda+C_0x^0 = &\\ (D_{(M-1)}x^{(M-1)}+\Lambda+D_0x^0)*x^K + &\\ C_{(K-1)}x^{(K-1)}+\Lambda+C_0x^0. &\end{aligned}$$

C(x) in Equation 3 is designed to be divisible by the K-th order Reed-Solomon code generator polynomial g(x); thus, the following equation is obtained:

$$\begin{aligned}C_{(K-1)}x^{(K-1)}+\Lambda+C_0x^0 = & [(D_{(M-1)}x^{(M-1)}+\Lambda+D_0x^0)*x^K]\\ & \mod g(x). \quad \text{(Equation 4)}\end{aligned}$$

As shown in Equation 4, the K subsets of redundancy blocks ($C_{(K-1)}$, $C_{(K-2)}$, ..., $C_0$) can be generated based on g(x) and the M subsets of data blocks ($D_{(M-1)}$, $D_{(M-2)}$, ..., $D_0$).

Because the primitive elements in the coefficient field $GF(q^P)$ are distributive under the '+' and '×' operators, Equation 4 can be re-written as:

$$\begin{aligned}C_{(K-1)}x^{(K-1)}+\Lambda+C_0x^0 = & [(D_{(M-1)}x^{(M-1)}+\Lambda+D_0x^0)*x^K] \quad \text{(Equation 5)}\\ \mod g(x) = & [D_{(M-1)}x^{(M+K-1)}]\mod g(x) +\\ & \Lambda + [D_0x^K]\mod g(x) =\\ & D_{(M-1)}[x^{(M+K-1)}]\mod g(x) + \Lambda + D_0[x^K]\mod g(x)\end{aligned}$$

The data storage system 10 according to this invention can previously calculate $[x^{(M+K-1)}]$mod g(x), $[x^{(M+K-2)}]$mod g(x), ..., and $[x^K]$mod g(x) in Equation 5 since g(x) is previously determined. The calculated results can be summarized as:

$$x^{(M+K-i)}\mod g(x) = \sum_{j=1}^{K} a_{(M-i),(K-j)}x^{(K-j)}, \quad \text{(Equation 6)}$$

wherein i is an integer index ranging from 1 to M and j is an integer index ranging from 1 to K.

According to Equation 5 and 6, the jth subset of redundancy block ($C_{(K-j)}$) among the K subsets of redundancy blocks can be generated according to the following equation:

$$C_{(K-j)} = \sum_{i=1}^{K} D_{(M-i)}a_{(M-i),(K-j)}, \quad \text{(Equation 7)}$$

wherein $a_{(M-i),(K-j)}$ can be divided into K sets of parameters according to different j, each set of parameters includes M parameters, and the ith parameter in the jth set of parameters ($a_{(M-i),(K-j)}$) is equal to the coefficient of $x^{(K-j)}$ in the result of: $x^{(M+K-i)}$ mod g(x).

In the preferred embodiment according to this invention, the data storage system 10 previously calculate the K sets of parameters and stores the K sets of parameters in the look-up table 13. During the process of generating redundancy blocks according to Equation 7, the encoder 121 accesses the K sets of parameters from the look-up table 13. In actual applications, the encoder 121 can include a GF multiplier and an accumulator.

As known by people skilled in the art, the decoding capability of the K-th order Reed-Solomon code generator polynomial is K. That is to say, once up to K blocks among the (M+K) blocks are failed, as long as the positions of the failed blocks are known, the recovering module 122 can recover the failed blocks based on the K sets of parameters and the other un-failed blocks. Especially, K can be larger than two. Accordingly, the data storage system according to this invention provides K-faults protection.

As shown in Equation 7, the data storage system according to this invention can generate redundancy blocks by simply using adding and multiplying. Therefore, another advantage of this invention is that the hardware or circuits in the data storage system are very simple. Furthermore, when a different generator polynomial is used, only the parameters stored in the look-up table are needed to be changed instead of re-designing the whole circuits.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. In a data storage system, K sets of parameters, which are generated based on a generator polynomial, being previously provided, K being a positive integer, said data storage system comprising:

an array of storage devices configured to store information in the form of a plurality of stripes; and a storage controller coupled to the storage devices and configured to write a plurality of code words forming each stripe to said array of storage devices;

wherein said plurality of code words represents a systematic mapping of a plurality of data blocks according to the generator polynomial and comprises said plurality of data blocks and at least one redundancy block, and wherein said storage controller comprises an encoder, which is configured to generate said at least one redundancy block according to the plurality of data blocks and the K sets of parameters during an encoding mode of operation.

2. The data storage system of claim 1, wherein once up to K storage devices in the array of storage devices are failed, the data storage system recovers the code words in the failed storage devices based on the K sets of parameters and the code words in the other un-failed storage devices.

3. The data storage system of claim 1, wherein the generator polynomial is a cyclic code generator polynomial.

4. The data storage system of claim 1, wherein said generator polynomial is a K-th order generator polynomial: $g(x)=(x-e^N)\times(x-e^{(N+1)})\times\ldots\times(x-e^{(N+K-1)})$, wherein a coefficient field corresponding to the K-th order generator polynomial is $GF(q^P)$, e is a primitive element of the coefficient field $GF(q^P)$, q is a prime number, P and N are both positive integers.

5. The data storage system of claim 1, wherein the array of storage devices comprises (M+K) storage devices, M is a positive integer, each set among the K sets of parameters comprises M parameters, and the ith parameter in the jth set of parameters ($a_{(M-i),(K-j)}$) is equal to the coefficient of $x^{(K-j)}$ in the result of:

$$x^{(M+K-i)} \bmod g(x),$$

wherein i is an integer index ranging from 1 to M and j is an integer index ranging from 1 to K.

6. The data storage system of claim 5, wherein a stripe in the array of storage devices comprises M subsets of data blocks ($D_{(M-1)}, D_{(M-2)}, \ldots, D_0$) and K subsets of redundancy blocks ($C_{(K-1)}, C_{(K-2)}, \ldots, C_0$) generated by the encoder, each subset is stored in one storage device among the array of storage device, respectively, the relation between the M subsets of data blocks and K subsets of redundancy blocks is:

$$C_{(K-j)} = \sum_{i=1}^{M} D_{(M-i)} a_{(M-i),(K-j)}.$$

7. The data storage system of claim 6, wherein the encoder comprises a GF multiplier and an accumulator.

8. The data storage system of claim 1, wherein the array of storage devices comprises disk drives.

9. The data storage system of claim 1, further comprising a look-up table for storing the K sets of parameters.

10. A method of generating K redundancy blocks ($C_{(K-1)}, C_{(K-2)}, \ldots, C_0$) for M data blocks ($D_{(M-1)}, D_{(M-2)}, \ldots, D_0$), M being a positive integer and K being a positive integer smaller than or equal to M, K sets of parameters, which are generated based on a K-th order generator polynomial g(x), being previously provided, each set among the K sets of parameters comprising M parameters, and the ith parameter in the jth set of parameters among the K sets of parameters ($a_{(M-i),(K-j)}$) being equal to the coefficient of $x^{(K-j)}$ in the result of: $x^{(M+K-i)} \bmod g(x)$, wherein i is an integer index ranging from 1 to M and j is an integer index ranging from 1 to K, the method comprising the step of:

generating the jth redundancy block ($C_{(K-j)}$) among the K redundancy blocks according to the following equation:

$$C_{(K-j)} = \sum_{i=1}^{M} D_{(M-i)} a_{(M-i),(K-j)}.$$

11. The method of claim 10, further comprising the step of:

recovering the failed blocks based on the K sets of parameters and the other un-failed blocks once up to K blocks among the M data blocks and the K redundancy blocks are failed.

12. The method of claim 10, wherein the generator polynomial is a cyclic code generator polynomial.

13. The method of claim 10, wherein the generator polynomial is $g(x)=(x-e^N)\times(x-e^{(N+1)})\times\ldots\times(x-e^{(N+K-1)})$, wherein a coefficient field corresponding to the generator polynomial is $GF(q^P)$, e is a primitive element of the coefficient field $GF(q^P)$, q is a prime number, P and N are both positive integers.

* * * * *